US008926302B1

United States Patent
Buckley

(10) Patent No.: US 8,926,302 B1
(45) Date of Patent: Jan. 6, 2015

(54) ADJUSTABLE FOOD PRESS

(76) Inventor: Christina Buckley, White Plains, NY (US)

(*) Notice: Subject to any disclaimer, the term of this patent is extended or adjusted under 35 U.S.C. 154(b) by 959 days.

(21) Appl. No.: 13/047,155

(22) Filed: Mar. 14, 2011

Related U.S. Application Data

(60) Provisional application No. 61/343,125, filed on Apr. 22, 2010.

(51) Int. Cl.
*A47J 43/20* (2006.01)

(52) U.S. Cl.
USPC ............. 425/87; 425/318; 425/352; 425/416; 425/419

(58) Field of Classification Search
USPC .......... 426/512, 520; 425/416, 419, 338, 408, 425/406, 318, 469, 395, 87, 352; D7/672
See application file for complete search history.

(56) References Cited

U.S. PATENT DOCUMENTS

| | | | | |
|---|---|---|---|---|
| 1,749,178 | A * | 3/1930 | Berg | 425/318 |
| 3,120,678 | A * | 2/1964 | Glenny | 425/318 |
| 3,121,385 | A * | 2/1964 | Blackburn et al. | 99/374 |
| 3,490,358 | A * | 1/1970 | Bardeau et al. | 99/353 |
| 4,057,874 | A * | 11/1977 | Walker, Jr. | 425/318 |
| 4,217,817 | A | 8/1980 | Meamber | |
| 4,484,516 | A | 11/1984 | Bimman | |
| 4,608,918 | A * | 9/1986 | Funabashi et al. | 99/450.4 |
| 4,702,159 | A | 10/1987 | Polster | |
| 5,992,302 | A | 11/1999 | Geisler | |
| 7,059,318 | B2 | 6/2006 | Cornfield | |
| 8,202,073 | B1 * | 6/2012 | Kovalevich et al. | 425/87 |
| 2004/0255792 | A1 | 12/2004 | Parker | |
| 2006/0078642 | A1 * | 4/2006 | Palese | 425/416 |

FOREIGN PATENT DOCUMENTS

GB 2466320 A * 6/2010 ............. A47J 37/06

* cited by examiner

*Primary Examiner* — Steven Leff
(74) *Attorney, Agent, or Firm* — Goldstein Law Offices, P.C.

(57) ABSTRACT

An adjustable food press for making a wide variety of hot and cold sandwiches and other foods that are compressed during preparation. The food press has a dome and a handle assembly, attached to a pressing plate inside the dome, that adjusts the position of the pressing plate to the desired sandwich thickness. Once positioned, the handle assembly is locked in position, holding the pressing plate in place until the sandwich is ready. When the pressing plate is released, the dome is left in place to keep the food warm, or removed and used on the same or a different sandwich style. The food press functions with a variety of flat-surfaced cooking equipment used to prepare hot and cold food. The dome prevents spatter of grease and food particles on surrounding surfaces. The pressing plate is removable for cleaning or for interchanging with a different style of pressing plate.

8 Claims, 7 Drawing Sheets

ADJUSTABLE FOOD PRESS

CROSS-REFERENCE TO RELATED APPLICATIONS

This application is a nonprovisional utility application of the provisional patent application, Ser. No. 61/343,125 filed in the United States Patent Office on Apr. 22, 2010, and claims the priority thereof.

BACKGROUND OF THE INVENTION

The invention relates generally to an adjustable food press. More particularly, the invention relates to a food press with a dome and an adjustable pressing plate that locks in place at various heights which is useful for making a wide variety of hot and cold flat sandwiches and other foods that are compressed during preparation.

Many people have fond childhood memories of a hot school lunch of tomato soup and a grilled cheese sandwich, now considered a comfort food for adults. The popularity of grilled cheese and the blending of diverse cultures have placed many variations of the simple grilled cheese sandwich on menus both in restaurants and in homes. Now people enjoy quesadillas, panini, croque monsieur, Monte Cristo, as well as the humble tuna melt sandwiches. They all share the characteristic of being served hot and flattened, with a featured filling between two pieces of bread or alternatively, tortillas.

The popularity of these choice foods has led to a large number of specialized electrical appliances for the preparation of these hot flattened sandwiches. A quesadilla maker may share counter space with a panini maker, which is alongside a hamburger grill. Each consists of two hinged electrically heated plates that snap together, each appliance having a set distance apart of the heated plates depending on the desired end product. Some appliances are more versatile and have a variety of plates that snap in for different types of sandwiches. However, because the plates are very hot for a period after use, this type of appliance is not sufficiently adaptable to make a variety of sandwiches for one meal.

Some cooks still prefer to make these sandwiches the old-fashioned way in a fry pan or on a griddle on the stove. Usually this means that the cook makes one at a time, pressing with a spatula or a bacon press on the back of the sandwich to give it that characteristic shape. The cook must hold the spatula or press in place while the sandwich cooks. Only one side of the sandwich heats at a time, slowing down the process. Some cooks prepare the filling first, pressing down on the meat, such as hamburger, or bacon before placing the filling between the slices of bread. Whether flattening the whole sandwich or just the filling, when the cook presses down on the food, grease and food particles going flying around the stove, onto the cook and nearby surfaces. The manual process becomes tedious, tiring, messy, and time consuming. The cook cannot prepare anything else simultaneously because pressing the sandwich occupies his or her attention.

Some hosts also like to make flattened cold sandwiches, which are typically filled, flattened, cut into small shapes and served as appetizers. Flattening cold sandwiches is a manual process that is not readily adaptable to the various electrical appliances.

The home cook has no alternative if he or she desires to serve a variety of hot, flattened sandwiches at one meal, other than to painstakingly do each one individually, focusing full attention to the sandwich at hand. Side courses must wait or be made in advance to accompany the sandwiches. The various electrical appliances do not have sufficient flexibility to adapt to changing sandwich styles for one meal, even if the appliance has a variety of plates available.

While these units may be suitable for the particular purpose employed, or for general use, they would not be as suitable for the purposes of the present invention as disclosed hereafter.

SUMMARY OF THE INVENTION

It is an object of the invention to produce an adjustable food press that minimizes the mess from splatter during preparation. Accordingly, the adjustable food press includes a dome that overlays the sandwich or food that prevents grease and food particles from splattering on surrounding surfaces.

It is another object of the invention to produce an adjustable food press that promotes faster cooking and keeps the food warm after cooking. Accordingly, the adjustable food press includes a dome that overlays the sandwich or food that keeps the heat from the cooking surface from dissipating and minimizes heat transfer to the environment.

It is yet another object of the invention to produce an adjustable food press that functions with a variety of cooking equipment. Accordingly, the adjustable food press functions on any heated flat surface such as pan or griddle, heated directly by a stove, or powered directly by electricity or on a cold flat surface, such as a sandwich board or cutting board.

It is a further object of the invention to produce an adjustable food press that produces a cold, flattened sandwich. Accordingly, the adjustable food press functions on any flat surface suitable for placing food and flattens the cold sandwich in a hands-free manner by placing the pressing plate against the sandwich and engaging the adjustable handle to the appropriate height to hold the pressing plate against the sandwich.

It is yet a further object of the invention to produce an adjustable food press that allows the user to prepare a hot pressed sandwich in a hands-free manner. Accordingly, the adjustable food press is set in place on top of a sandwich sitting on a flat heated surface, the height of a pressing plate is adjusted and the food press remaining in place, pressing the sandwich until the user removes the device, allowing the user to perform other tasks without having to hold the food press in place.

It is an additional object of the invention to produce an adjustable food press that allows the cook to prepare a pressed sandwich in a variety of styles and thicknesses. Accordingly, the adjustable food press has an adjustable handle assembly, having a vertically movable rod assembly and a locking assembly, the handle assembly lowering the pressing plate onto the sandwich to the desired thickness of the sandwich, and engaging the locking assembly on the rod assembly to hold the pressing plate in place.

The invention is an adjustable food press for making a wide variety of hot and cold sandwiches and other foods that are compressed during preparation. The food press has a dome and a handle assembly, attached to a pressing plate inside the dome, that adjusts the position of the pressing plate to the desired sandwich thickness. Once positioned, the handle assembly is locked in position, holding the pressing plate in place until the sandwich is ready. When the pressing plate is released, the dome is left in place to keep the food warm, or removed and used on the same or a different sandwich style. The food press functions with a variety of flat-surfaced cooking equipment used to prepare hot and cold food. The dome prevents spatter of grease and food particles on surrounding surfaces. The pressing plate is removable for cleaning or for interchanging with a different style of pressing plate.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
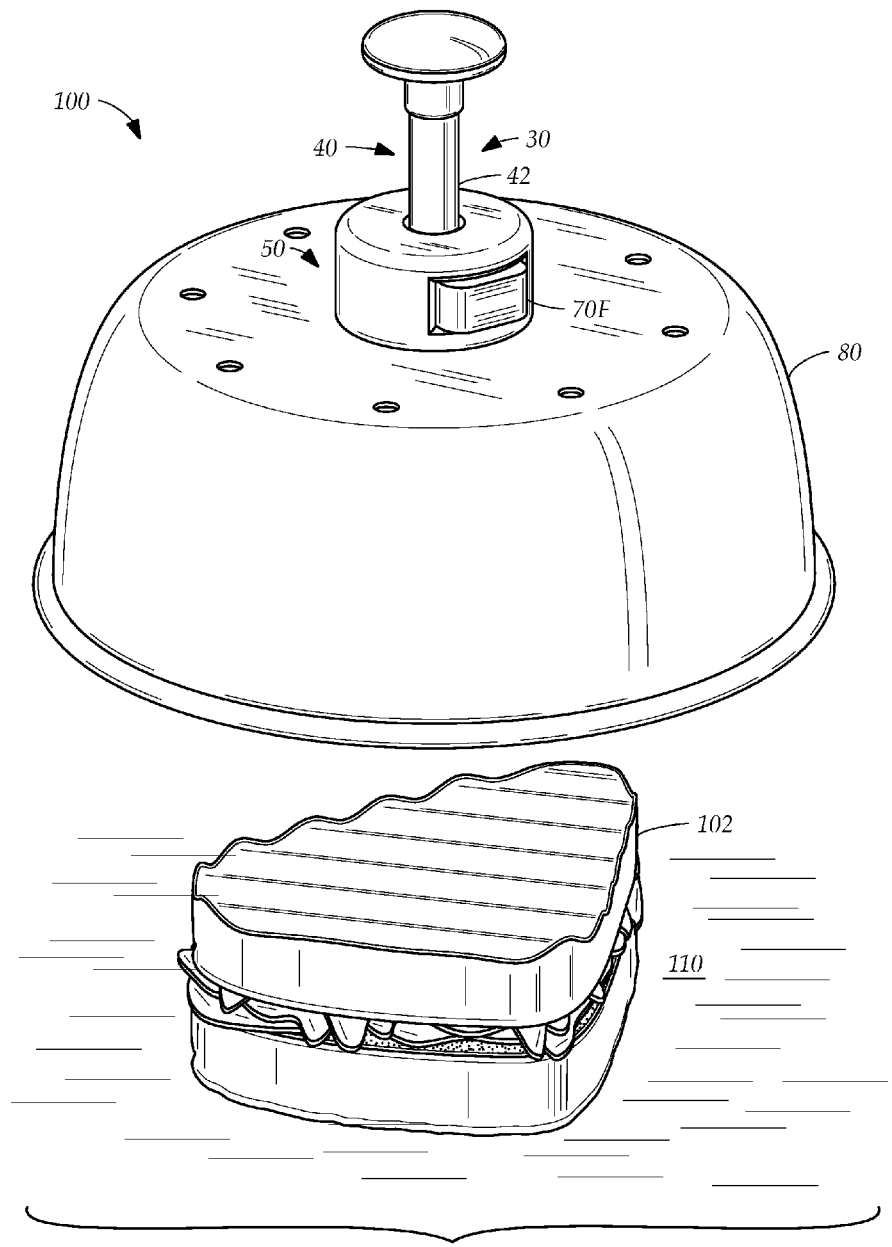
FIG. 1 is a diagrammatic perspective view of an adjustable food press, showing a dome and a handle assembly as the adjustable food press is removed from a prepared sandwich.

FIG. 1 demonstrates an adjustable food press 100 for compressing a sandwich 102 during preparation with an illustration of the prepared compressed sandwich 102. The adjustable food press 100 can be used to prepare a wide variety of hot and cold sandwiches that require or benefit from compression during the preparation. The adjustable food press 100 is used in combination with a flat food preparation surface 110, for example, but not limited to, either a hot surface, such as a frying pan or griddle or a cold surface, such as a sandwich board, plate or cutting board.

Figure 2:
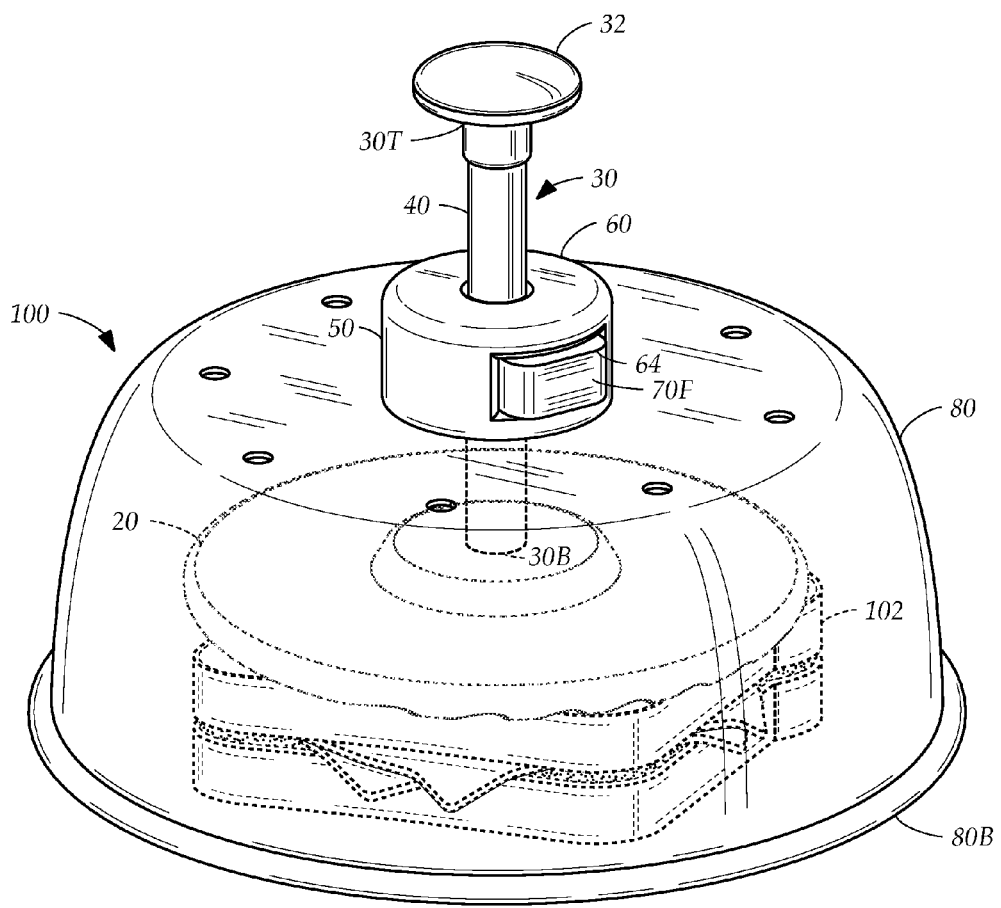
FIG. 2 is a diagrammatic perspective view of the adjustable food press from the front with the handle assembly and a pressing plate engaging a sandwich, showing the pressing plate, the sandwich and a portion of the handle assembly inside the dome in outline for clarity.

The adjustable food press 100 has a dome 80 and a weighted pressing plate 20 inside the dome 80, as shown in FIG. 2. The pressing plate 20 is attached to an adjustable handle assembly 30, having a locking assembly 50 that locks the handle assembly 30 in place to force the pressing plate against the sandwich 102. The pressing plate 20 and a portion of the handle assembly 30 are shown in outline in order to demonstrate the elements of the invention inside the dome 80. When the handle assembly 30 is unlocked, the handle assembly 30 moves vertically in an upward or downward motion. The user selectively adapts the height of the weighted pressing plate 20 to the height of the sandwich 102 by how far the handle assembly 30 is pushed downward, the further downward the handle assembly 30 is pushed, the thinner the resulting sandwich. Referring to FIG. 1, when preparation of the sandwich 102 is complete, the pressing plate is removed from the sandwich 102 by either removing the adjustable food press 100, or if a user desires to keep the prepared sandwich warm inside the dome 80, the pressing plate is moved off the sandwich by unlocking the handle assembly 30 and pulling the handle assembly 30 with the attached pressing plate vertically upward.

FIG. 2 further clarifies how the adjustable food press 100 functions. The handle assembly 30 has an exterior top 30T and an interior bottom 30B inside the dome 80. On the top 30T is a knob 32 for gripping the handle assembly 30. The weighted 20 is attached to the bottom 30B of the handle assembly 30 inside the dome 80. The handle assembly 30 has a rod assembly 40 between the top 50T and the bottom 30B. On the rod assembly 40 is the locking assembly 50 that stops vertical movement of the rod assembly 40 once the attached pressing plate 20 is in the desired position. As illustrated, the pressing plate 20 is forced against the sandwich 102, compressing the sandwich 102 against the preparation surface.

Figure 4:
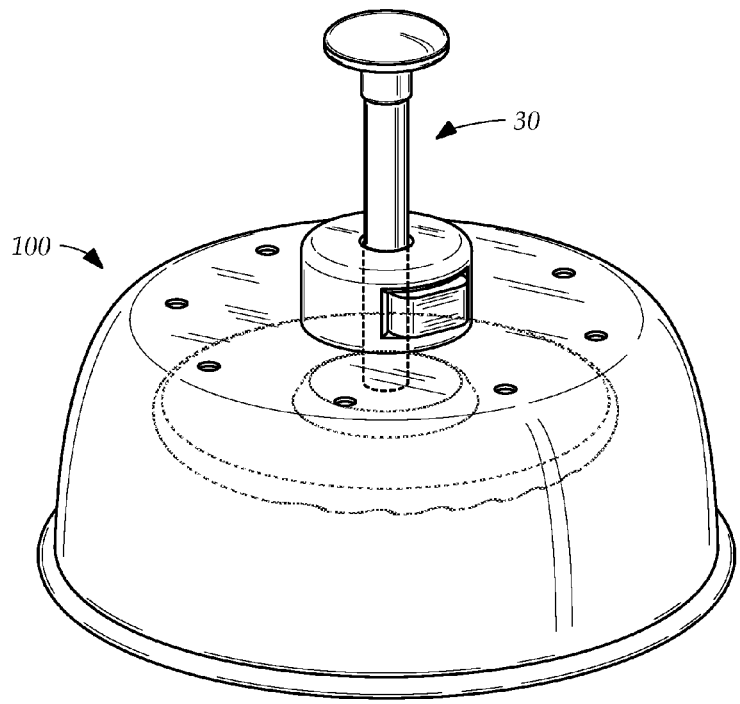
FIG. 4 is a diagrammatic perspective view of the adjustable food press from the front with the handle assembly in an almost full upwardly extended position, raising the pressing plate, showing the pressing plate, and the portion of the rod assembly inside the dome in outline for clarity.
Figure 5:
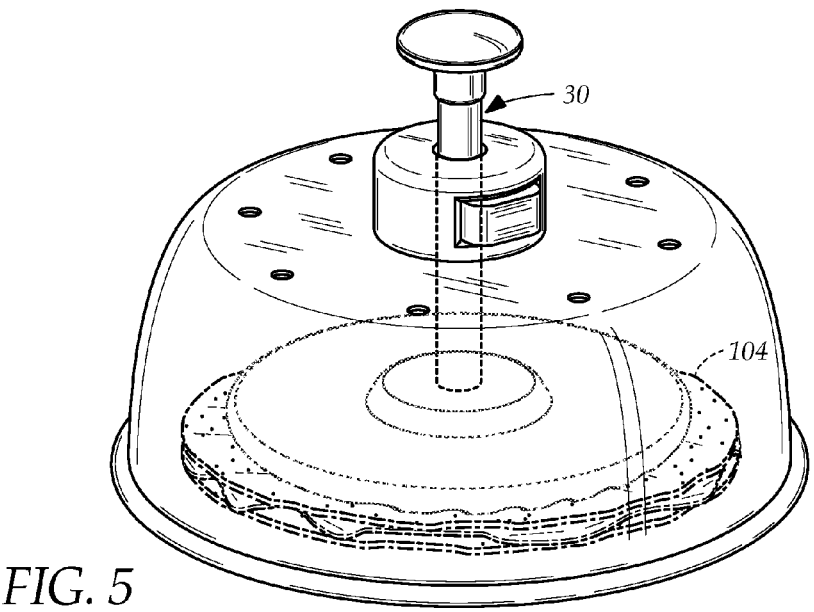
FIG. 5 is a diagrammatic perspective view of the adjustable food press from the front with the handle on the rod assembly in an almost full downwardly extended position, lowering the pressing plate to engage with a quesadilla, the pressing plate, the quesadilla and the portion of the rod assembly inside the dome shown in outline for clarity FIG. 6 a diagrammatic perspective view of the, bottom of the pressing plate, showing a bottom grille.

FIG. 5 shows the handle assembly 30 locked in a lower setting, almost full downwardly extended, positioning the pressing plate 20 to compress a thin sandwich, such as a quesadilla 104. FIG. 4 shows the adjustable food press 100 with the handle assembly 30 locked in a higher setting without any sandwich, almost full upwardly extended. With the handle assembly 30 in the full upwardly extended position, the food press 100 is ready to be placed over any style of sandwich prior to compressing.

Figure 3:
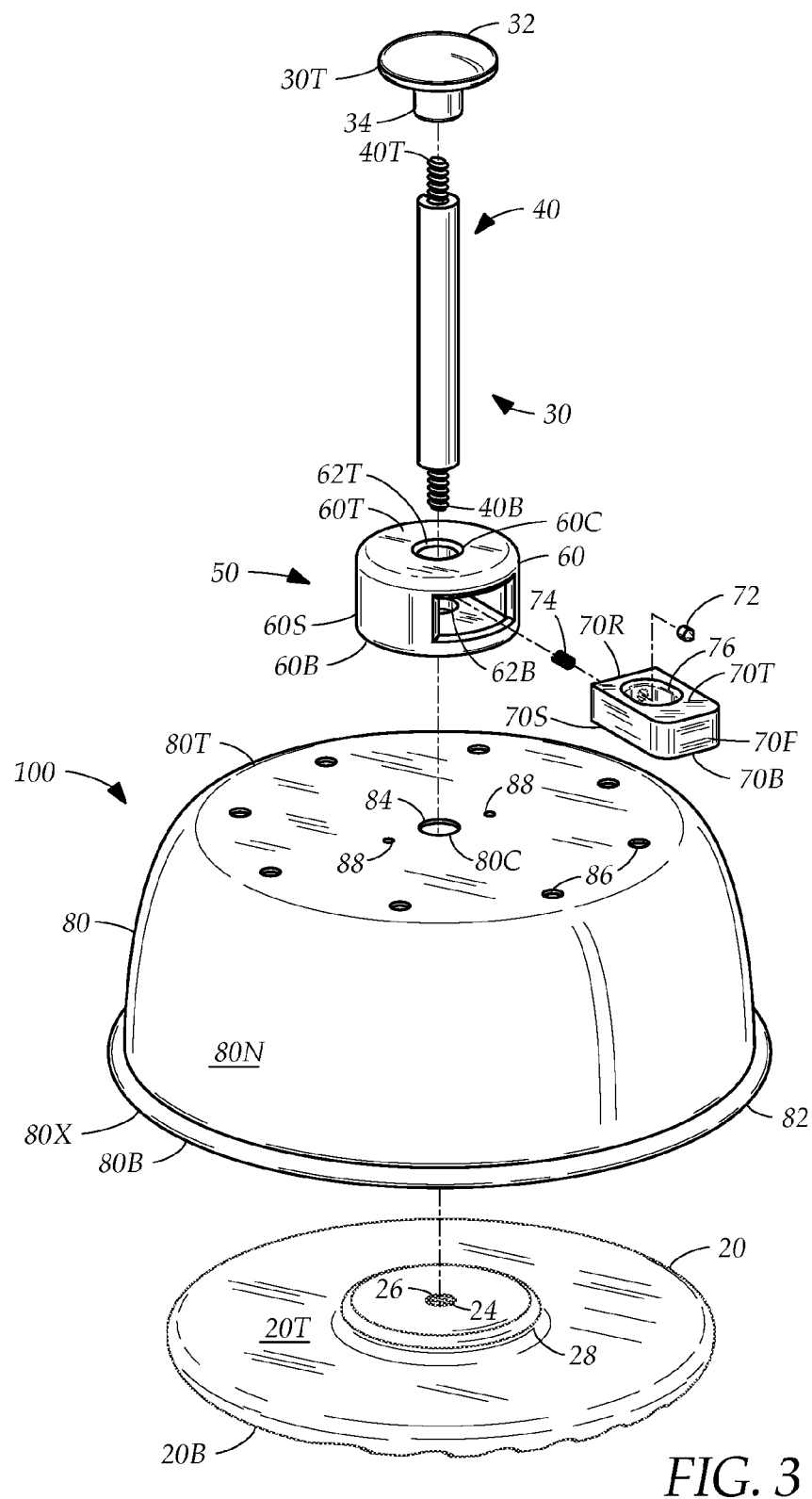
FIG. 3 is an exploded diagrammatic perspective view of the adjustable food press, separately showing the dome, the pressing plate, and the handle assembly, the handle assembly having a rod assembly and a locking assembly.

FIG. 3 is an exploded view of the adjustable food press 100. The dome 80 in the illustration is a hemisphere with an exterior 80X, an interior 80N, a flattened top 80T having a center 80C, and an open bottom 80B with a rim 82. In other examples, the dome is a rectangular-shaped hexahedron or square-shaped cube with a flat top and open bottom. The shape of the dome is inconsequential. It is understood by those of ordinary skill that these dome shapes are non-limiting examples and numerous shapes are possible within the inventive concept. The flattened top 80T optionally has a plurality of vents 86 to release steam while preparing sandwiches on heated surfaces. The flattened top 80T also has a center aperture 84 in the center 80C of the top 80T to accommodate the handle assembly 30 and fastener holes 88 for attaching the locking assembly 50.

The handle assembly 30 has the knob 32, the rod assembly 40, and the locking assembly 50 that encircles the rod assembly 40. The locking assembly 50 is on the flattened top 80T of the dome exterior 80X surrounding the rod assembly 40. The rod assembly 40 freely travels through the center aperture 84 in the dome 80. The rod assembly 40 has a top end 40T and a bottom end 40B, each end threaded with a helical ridge 48. At the top 30T of the handle assembly 30 is the knob 32, illustrated here as a round, slightly convex disk, on top of a short stem 34 with an interior threaded opening. The short stem 34 screws onto the threaded end 40T at the top of the rod assembly 40T. The variety of functional shapes and nonfunctional ornamentation for the knob 32 are understood to be numerous while adhering to scope and spirit of the present invention and are beyond the scope of this discussion.

The locking assembly 50 has a collet 60 and a lock housing 70 that is inserted into the collet 60. The collet 60 is a round hollow collar with a round top 60T, a round bottom 60B and a circumferential side 60S. The top 60T and bottom 60B each have a center 60C. In the top center 60C and the bottom center are openings, a top center opening 62T and a bottom center opening 62B for the rod assembly 40 to freely travel through. The openings 62T, 62B are aligned with the center aperture 84 on the dome top 80T. The collet is fixed in place by a plurality of fasteners engaged in the fastener holes 88 on the dome top 80T attaching the bottom 60B of the collet 60 to the dome top 80T. The collet 60 has a window on the side 60S for the lock housing 70 to move horizontally to engage the rod assembly 40 to prevent vertical movement of the rod assembly 40.

Figure 7:
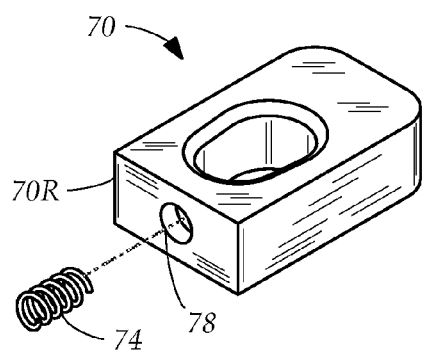
FIG. 7 is a diagrammatic perspective view of the locking assembly from the back, showing a spring, that when released, engages a catch on the locking assembly with the rod assembly.

The lock housing 70 is essentially a rectangular hexahedron with a top 70T, a bottom 70B, a pair of long sides 70S and a pair of short sides, a front side 70F and a back side 70R. The housing has an essentially ovoid cavity 76 extending from the top 70T to the bottom, 70B located off-center toward the back side 70R, equidistant between the pair of long sides 70S. The lock housing 70 has a catch 72 located inside the cavity 76 toward the back side 70R. The rod assembly 40 travels through the cavity 76 vertically until it is locked in place by engaging the catch 72. The catch 72 engages the rod assembly 40 by the horizontal motion of the lock housing 70 moving the rear side 70R of the housing 70 forward. Referring to FIG. 7, the lock housing 70 has a spring 74 inside a round groove 78 on the back side 70R. Referring to FIG. 3, the spring 74 is lodged in the round groove on the lock housing 70 and a groove on the side 60S of the collet 60 opposite the window 64.

Figure 6:
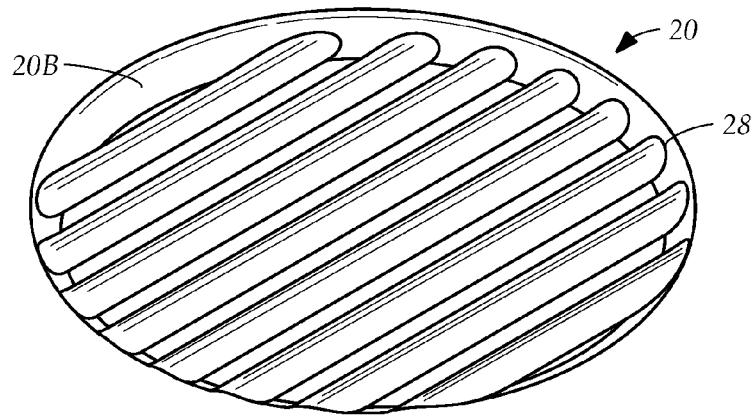

Referring to FIG. 3, the pressing plate 20 has a top surface 20T, a bottom surface 20B, a center 24 with a threaded opening 26 and a concentric ridge 28. The pressing plate 20 is relatively heavy, weighing more that the other parts of the food press combined and is preferably made from heavier cookware materials such as for example but not limited to, cast iron, heavy cast aluminum, or heavy cast steel. The concentric ridge 28 on the top surface 20T acts as a spacer to mount the pressing plate 20 onto the threaded end 40B of the rod assembly 40 without protruding through to the bottom surface 20B. FIG. 6 shows the bottom surface 20B of the pressing plate 20 with a grille 28. In another embodiment, the bottom surface is smooth and in yet another embodiment, the bottom surface has an intaglio or relief surface to stamp a design on the sandwich.

Referring to FIG. 3, to assemble the adjustable food press 100, the knob 32 is attached to the top 40T of the rod assembly 40, the rob assembly 40 passes through the top center opening 62T of the collet 60, through the cavity 76 in the lock housing 70, the bottom center opening 62 of the collet 60 and the aperture 84 on the top 80T of the dome 80, the bottom 40B of the rod assembly 40 now inside the dome 80. The pressing plate 20 is attached to the bottom 40B of the rod assembly 40 by threading the bottom threaded end 40B of the rod assembly 40 into the threaded opening 26. The pressing plate 20 is easily removed by unthreading the plate 20 for cleaning and to interchange various pressing plates. Various pressing plates of different sizes, and bottom surfaces are interchanged on the bottom of the rod assembly by unthreading the first pressing plate and threading a second pressing plate. Using the threaded end 40B of the rod assembly 40 and a threaded opening 26 on the top surface 20T of the pressing plate 20 for interchanging pressing plates is a non-limiting example of a method to interchange pressing plates. Other methods of interchangeable connections are well know to those of ordinary skill without departing from the inventive concept and it is intended that the present invention cover such modifications and variations.

Figure 8:
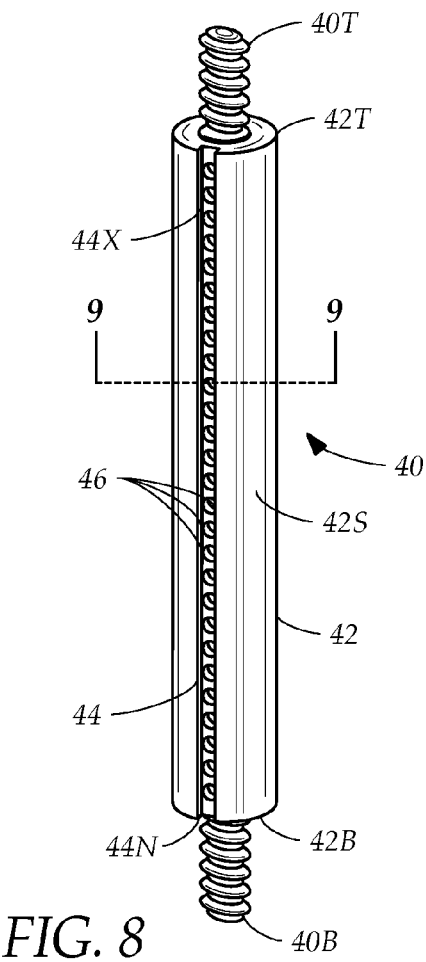
FIG. 8 is a diagrammatic perspective view of the rod assembly from the back, showing a pair of threaded ends, a shaft with a channel, the channel having a plurality of slots.

FIG. 8 shows the rod assembly 40 with the top threaded end 40T and the bottom threaded end 40B, a round shaft 42 that extends vertically between the threaded ends 40T, 40B, having a top 42T and a bottom 40B substantially extending to the threaded ends 40T, 40B and an outside surface 42S. The rod assembly 40 has a longitudinal channel 44 cut into the shaft 42 extending the length of the shaft 42 from the top 42T, adjacent to the top threaded end 40T, and the bottom 42B, adjacent to the bottom threaded end 40B. The channel 44 has an outside opening 44X, contiguous with the outside surface 42S of the shaft 42 and an inside opposite the outside opening 44N. On the inside of the channel 44 is a plurality of round slots 46 extending the length of the channel 44 to engage the catch on the lock. The channel 44 on the shaft 42 is oriented so that when the rod assembly 40 is inside the collet, the channel 42 is opposite the window on the collet.

Figure 10A:
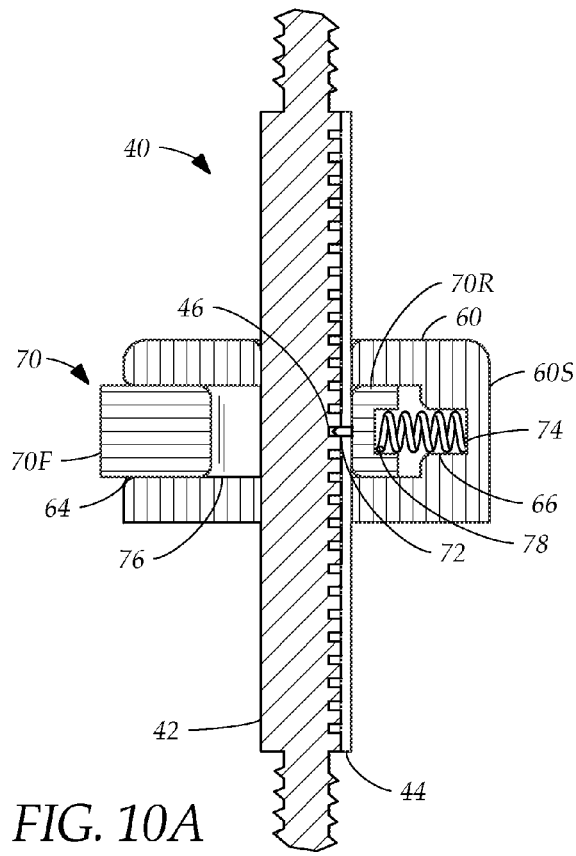
FIG. 10A is a cross-section view from the side of the rod assembly and the locking assembly, showing a front side of the lock housing in an extended position, the spring pushing the catch into a slot on the shaft to lock the rod assembly in place, preventing vertical movement of the rod assembly.

FIG. 10A is a cross-section of the locking assembly 50 with the lock housing 70 inside the collet 60, encircling the rod assembly 40, showing the catch 72 of the lock housing 70 engaged in a round slot 46 in the channel 44 on the shaft 42. The spring 74 in the round groove 78 on the back side 70R of the lock housing 70 extends into a second round groove 66 in the collet 66, located opposite the window 64 of the collet 60. When the spring 74 is essentially extended, the force of the spring tension pushes the back side 79R of the housing 70 forward and shifts the ovoid cavity 76 forward. The shaft 42 sits inside the cavity 76 of the housing 70, towards the back side 70R of the housing and the catch 72 is in the cavity 76 towards the back side 70R of the housing 70. By pushing the back side 70R of the housing 70 forward, the catch 72 is pushed forward to engage the slot 46 in the channel 44 of the shaft 43. The spring 74 also pushes the front side 70F of the lock housing 70 forward, through and extending beyond the window 64 of the collet 60.

Figure 10B:
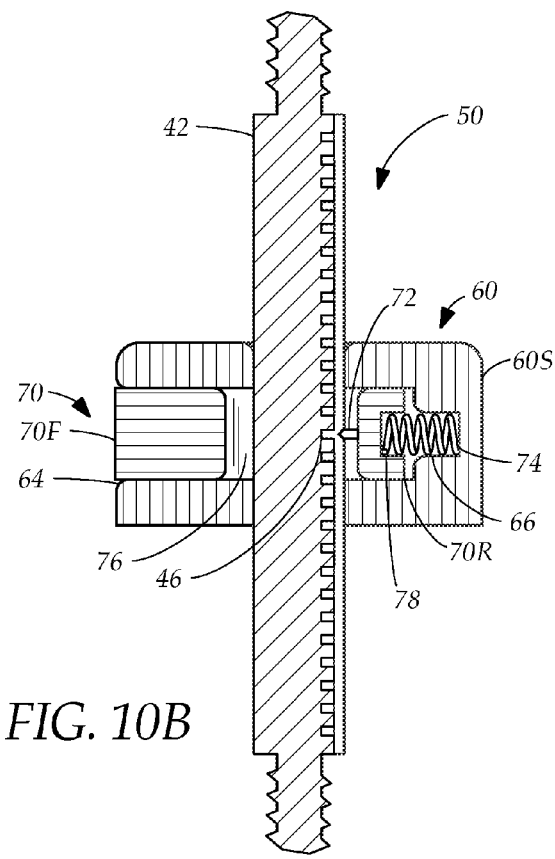
FIG. 10B is a cross-section view from the side of the rod assembly and the locking assembly, showing a front side of the lock housing in a depressed position, the catch disengaged from the slot on the shaft, but engaged in a channel on the shaft, allowing vertical movement but preventing rotational movement of the rod assembly.

FIG. 10B shows the cross-section of the locking assembly 70 in a release mode. The front side 70F of the housing 70 is pushed into the window 64 of the collet 60, shifting the housing 70 and the ovoid cavity 76 inside the housing 70 toward the side 60S opposite the window 64. The back side 70R of the housing 70 compresses the spring 74 into the pair of grooves, one on the housing 78 and one on the collet 66. The cavity 76 moves backward, positioning the shaft 42 toward the front side 70F of the lock housing 70, and the catch 72 on the back side 70R of the housing 70 moves out of the slot 46 on the shaft 42. The shaft 42 can travel vertically within the lock housing 70 inside the collet 60 when the front 70F of the housing 70 is pushed in the window 64. When the spring 74 is compressed and pressure from the housing 70 is released, tension in the spring 74 will push the housing 70 forward and engage the catch 72 into one of the slots 46 on the shaft 42 once the front side 70F of the housing 70 is released. The user only presses on the housing 70 to unlock the locking assembly 50 when vertically adjusting the rod assembly 40.

Figure 9A:
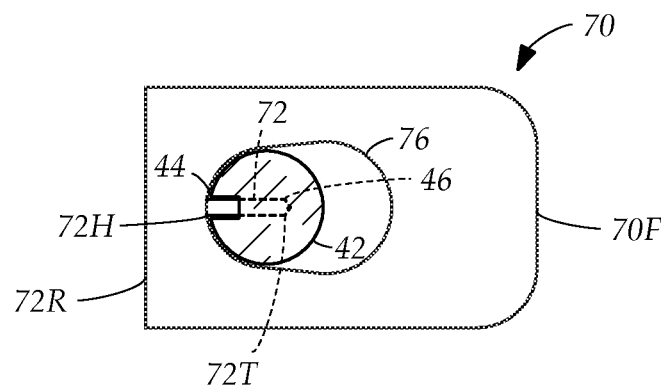
FIG. 9A is a top plan view of a lock housing showing a portion of the shaft in cross-section with a catch shown in outline engaged in a slot of the shaft, locking the rod assembly in place.
Figure 9B:
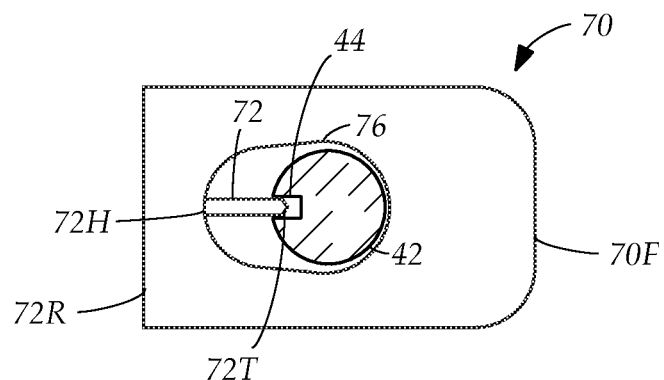
FIG. 9B is a top plan view of the lock housing showing the portion of the shaft in cross-section with the catch clear of the slot of the shaft but engaged in the channel, releasing the rod assembly vertically, but preventing the shaft from rotating.

FIG. 9A and FIG. 9B demonstrate how the lock housing 70 prevents both vertical and rotational movement of the shaft 42, preventing the shaft 42 from rotating and misaligning the channel 44 with the catch 72. FIG. 9A is a top plan view of the housing 70 with a horizontal cross-section of the shaft 42. The lock housing 70 is in the lock position, the front side 70F of the housing 70 extending beyond the window of the collet, which is not shown in this drawing for clarity. The cavity 76 is in the forward position, placing the shaft 42 of the rod assembly towards the back side 70R of the housing 70. The catch has a tip 72T, shown in outline, and a hilt 72H. The tip 72T of the catch 72 is engaged in one of the slots 46 on the shaft 42 and the hilt 72H of the catch 72 is positioned in the channel 44. In this position, the shaft 42 cannot travel vertically or rotate horizontally.

FIG. 9B is the top plan view of the housing 70, with lock in the release position. The front side 70F of the lock housing 70 is pushed in, moving the cavity 76 away from the window in the collet. The shaft 42 is positioned away from the back side 70R of the housing 70, and the catch 72 on the back side 70R of the housing 70 disengages from the slot on the shaft 42. The catch 72 is of a sufficient length such that the tip 72T of catch 72 does not disengage from the channel 44 on the shaft 42. With the catch 72 disengaged from the slot, the shaft 42 can travel vertically up and down. With the tip 72T of the catch 72 engaged in the channel 44, the shaft 42 cannot rotate horizontally and misalignment of the channel 44 with the catch 72 is not possible.

In another embodiment of the invention, the method of adjusting and locking the handle assembly has a rod assembly, a spring, and a grooved shaft, a collar on the dome with a ratchet holding the rod assembly and rotatable handle on the top of the rod assembly. The grooved shaft is positioned within the spring between the top handle and the collar on the dome. The ratchet has a pawl in the collar and a spring that forces the pawl into a groove on the shaft when the ratchet is engaged and locked. When the ratchet is locked in place, upward vertical movement of the rod assembly is prevented. Ratchets and grooved shafts are well-known by those of ordinary skill and that many variations of the rod assembly and locking assembly are possible within the inventive concept and are beyond the scope of the discussion.

Referring to FIG. 1, to use the food press 100, the user places the sandwich 102 on a flat cooking surface 110, such as on a griddle or a fry pan, either heated by a stove or as a separate electrical appliance. If the sandwich is not heated during preparation, the flat cooking surface 110 is a food preparation surface, such as a sandwich board, cutting board or plate. In this discussion, "sandwich" refers to any food, hot or cold, that is pressed as part of the preparation and includes, for example, but not limited to, quesadillas, panini, croque monsieur, Monte Cristo, grilled cheese, tuna melt, tea sandwiches as well as other foods that are pressed on a griddle while cooking, such as bacon, chipped meat and hamburger patties.

The open bottom 80B of the dome 80 is placed over the sandwich 102 as in FIG. 2, the rim at the bottom 80B creating a seal with the flat cooking surface. The user can lock the handle assembly 30 before or after placing the food press over the sandwich 102. The user determines the desired height of the pressing plate 20 and moves the attached handle assembly 30 to set the desired height of the pressing plate 20. To set the handle assembly 30 to the desired height, the user pushes the front side 70F of the lock housing 70 into the window 64 on the collet 60, pushing the catch 72 on the lock housing 70 out of the slot 46 on the shaft 42 of the rod assembly as illustrated in FIG. 10B. Referring to FIG. 2, the user moves the rod assembly 40 vertically upwards or downwards to engage the sandwich 102 as required to produce the desired height of the sandwich 102 such as the thick sandwich 102 in FIG. 2 or the thin quesadilla 104 in FIG. 5. As illustrated in FIG. 10A, the user releases the front side 70F of the lock housing 70, the lock housing 70 moves forward through the window, moving the catch 72 into one of the slots 46 on the shaft 42, engaging the locking assembly. The spring 74 lodged inside the groove 78 on the housing 70 and the groove 66 of the side 60S of the collet 60 opposite the window 64 is extended so that compression force must be applied to move the catch 72 out of the slot 46. Once the catch 72 is in the slot 46, vertical movement of the rod assembly 40 with the attached pressing plate is prevented. Referring to FIG. 2, the dome 80 remains in place during cooking to reduce the splatter of grease and food particles. The user does not need to maintain the pressing plate 20 on the sandwich 102, the locked rod assembly 40 maintaining the attached pressing plate 20 in place at the desired height on the sandwich 102. The user is available to complete other tasks while the adjustable food press 100 compresses the sandwich 102 in a hands-free manner. When the sandwich 102 is ready, the user removes the dome 80 from the sandwich 102 as shown in FIG. 1. Alternatively, the user may allow the dome 80 to remain over the hot sandwich 102 to keep it warm or to protect it from insects until serving. If the dome 80 remains in place, the user pushes the front side 70F of the lock housing in to disengage the locking assembly, pushing the catch out of the slot, allowing the rod assembly 40 and the attached pressing plate to vertically travel freely. Once the pressing plate moves vertically upward, detached from the sandwich 102, the user releases the front side 70F of the housing to reengage the locking assembly, the catch springing into one of the slots on the shaft 42. After use, the pressing plate is removed from the bottom of the rod assembly 40 for cleaning or replacing with a different pressing plate by unscrewing the pressing plate from the threaded bottom end of the rod assembly 40.

In conclusion, herein is presented an adjustable food press that adapts to a variety of foods and sandwiches with varying thicknesses. The food press has a dome with a pressing plate inside that adjusts to various heights and locks in place which is useful for making a wide variety of hot and cold flat sandwiches and other foods that are compressed during preparation. The invention is illustrated by example in the drawing figures, and throughout the written description. It should be understood that numerous variations are possible, while adhering to the inventive concept. Such variations are contemplated as being a part of the present invention.

What is claimed is:

1. An adjustable food press, for preparing a compressed sandwich on a flat cooking surface, comprising:
    a dome with an inside, an outside and a center aperture, the dome having a rim for creating a seal with the flat cooking surface;
    a weighted pressing plate inside the dome, the weighted pressing plate having a center opening, the weighted pressing plate movable to a lowered position to selectively engage the sandwich on the flat cooking surface; and
    an adjustable handle assembly, having a bottom inside the dome attached to the weighted pressing plate, a top outside the dome, a handle attached to the top, the handle allowing the user to selectively lower the weighted pressing plate against the sandwich, the handle assembly selectively maintaining said lowered position when the handle is released;

a vertical rod assembly between the top and the bottom of the adjustable handle assembly, the rod assembly having a top end and a bottom end, the rod assembly positioned inside the center aperture of the dome, extending inside the dome and outside the dome, moving vertically upwardly and downwardly, the center opening of the weighted pressing plate attaching onto the bottom end of the rod assembly, the rod assembly having a shaft, the shaft substantially extending to the top end and the bottom end of the rod assembly;

a vertical channel in the shaft between the top end and the bottom end of the rod assembly, the vertical channel having a plurality of slots inside the channel, the adjustable handle assembly; and a locking assembly, the locking assembly surrounding the rod assembly outside the dome and selectively engaging the rod assembly to prevent vertical movement of the rod assembly, the locking assembly further comprising:

a collet, the collet having a top, a bottom, the top and the bottom each having a center opening for inserting the shaft, a side with a window and a first groove opposite the window;

a lock housing with a top, a bottom, a front side, a back side with a second groove aligned with the first groove on the collet, a pair of long sides, an ovoid cavity between the top and the bottom, parallel to the pair of long sides and toward the back side, the lock housing inserted into the window of the collet and the shaft inserted into the ovoid cavity;

a spring lodged inside the first groove on the side of the collet and the second groove on the back side of the lock housing, the spring pressing against the back side of the lock housing, forcing the lock housing forward and out through the window of the collet, thereby selectively locking the handle assembly, preventing the handle assembly moving vertically upward or downward; and a catch inside the cavity inside the lock housing, the catch selectively engaging a slot on the shaft when the spring forces the lock housing forward to prevent vertical movement of the handle assembly and selectively disengaging a slot on the shaft but engaging the channel of the shaft when the lock housing is pushed back into the collet unlocking the handle assembly, selectively allowing vertical movement of the handle assembly but preventing rotational movement of the shaft.

2. The adjustable food press as described in claim 1 wherein the handle assembly has a knob, the knob having a stem, the stem attaching onto the top end of the rod assembly.

3. The adjustable food press as described in claim 2 wherein the dome has a top with a plurality of vent holes to release steam when heating the compressed sandwich.

4. The adjustable food press as described in claim 3 wherein the weighted pressing plate is relatively heavy, constructed from cast metal and weighing more than the dome and handle assembly combined.

5. The adjustable food press as described in claim 4 wherein the weighted pressing plate has a bottom having a grille design.

6. An adjustable food press for preparing a compressed sandwich on a flat cooking surface, comprising:

a dome with a bottom rim, an inside, an outside and a center aperture, the rim creating a seal with the flat cooking surface;

an adjustable handle assembly, having a bottom inside the dome, a top outside the dome, a vertical rod assembly between the top and the bottom of the adjustable handle assembly, the rod assembly positioned inside the center aperture of the dome, extending inside the dome and outside the dome, moving vertically upwardly and downwardly, the rod assembly having a top end and a bottom end, the rod assembly having a knob, the knob having a stem, the stem attaching onto the top end of the rod assembly, the rod assembly having a shaft, the shaft having a vertical channel substantially extending to the top end and the bottom end of the rod assembly, the vertical channel having a plurality of slots inside the channel to prevent vertical movement of the rod assembly, the handle assembly having a locking assembly, the locking assembly surrounding the rod assembly outside the dome and selectively engaging the rod assembly via the plurality of slots to prevent vertical movement of the rod assembly, the locking assembly further comprising:

a collet, the collet having a top, a bottom, the top and the bottom each having a center opening for inserting the shaft and a side with a window and a first groove opposite the window;

a lock housing with a top, a bottom, a front side, a back side with a second groove aligned with the first groove on the collet, a pair of long sides, an ovoid cavity between the top and the bottom, parallel to the pair of long sides and toward the back side, the lock housing inserted into the window of the collet and the shaft inserted into the ovoid cavity of the lock housing;

a spring lodged inside the groove on the side of the collet and the groove on the back side of the lock housing, the spring pressing against the back side of the lock housing, forcing the lock housing forward through the window of the collet, selectively locking the handle assembly, preventing the handle assembly moving vertically upward or downward; and a weighted pressing plate inside the dome, the weighted pressing plate having a center, the center having a center opening attaching to the bottom of the adjustable handle assembly inside the dome, wherein the pressing plate is relatively heavy, constructed from cast metal and weighing more than the dome and handle assembly combined, the pressing plate movable to a lowered position to selectively engage the sandwich on the flat cooking surface, the handle assembly selectively maintaining said lowered position when the handle is released.

7. The adjustable food press as described in claim 6 wherein the cavity in the lock housing has an inside with a catch, the catch selectively engaging a slot on the shaft when the spring forces the lock housing forward to prevent vertical movement of the handle assembly and selectively disengaging a slot on the shaft but engaging the channel of the shaft when the lock housing is pushed back into the collet, allowing vertical movement of the handle assembly but preventing rotational movement of the shaft.

8. The adjustable food press as described in claim 7 wherein the dome has a top with a plurality of vent holes to release steam while heating the compressed sandwich.

* * * * *